United States Patent [19]

Mayfield

[11] Patent Number: 4,934,406
[45] Date of Patent: Jun. 19, 1990

[54] THROTTLING VALVE

[75] Inventor: William B. Mayfield, Costa Mesa, Calif.

[73] Assignee: Parker-Hannifin Corporation, Cleveland, Ohio

[21] Appl. No.: 926,320

[22] Filed: Nov. 3, 1986

[51] Int. Cl.⁵ .................. F16K 31/08; F16K 31/10
[52] U.S. Cl. ................................ 137/595; 251/65; 251/129.08; 251/129.1; 251/129.2
[58] Field of Search ........... 137/595, 607, 637, 637.1, 137/867, 870; 251/129.08, 129.1, 129.2

[56] References Cited

U.S. PATENT DOCUMENTS

| | | | |
|---|---|---|---|
| 3,289,687 | 12/1966 | Dunaway | 137/870 X |
| 3,414,012 | 12/1968 | Webb | 251/129.2 X |
| 3,499,463 | 3/1970 | Trott et al. | 137/595 |
| 3,510,100 | 5/1970 | Makusay et al. | 251/129.2 |
| 3,589,677 | 6/1971 | Segers | 251/368 X |
| 3,945,607 | 3/1976 | Dashner | 251/368 X |
| 4,428,188 | 1/1984 | Turansky et al. | 137/595 X |
| 4,561,632 | 12/1985 | Hügler | 251/129.2 X |

FOREIGN PATENT DOCUMENTS 801872  7/1949  Fed. Rep. of Germany ...... 137/867

*Primary Examiner*—Stephen Hepperle
*Attorney, Agent, or Firm*—Ralph E. Jocke

[57] ABSTRACT

A direct drive throttling valve wherein two valve members (56 and 58) are connected to opposite ends of an armature (26). Armature (26) is supported in cantilevered fashion by flexure element (28) such that, when coils (32 and 34) are de-energized, the valve members are in the closed position. The coils are energized to open the valve members.

2 Claims, 2 Drawing Sheets

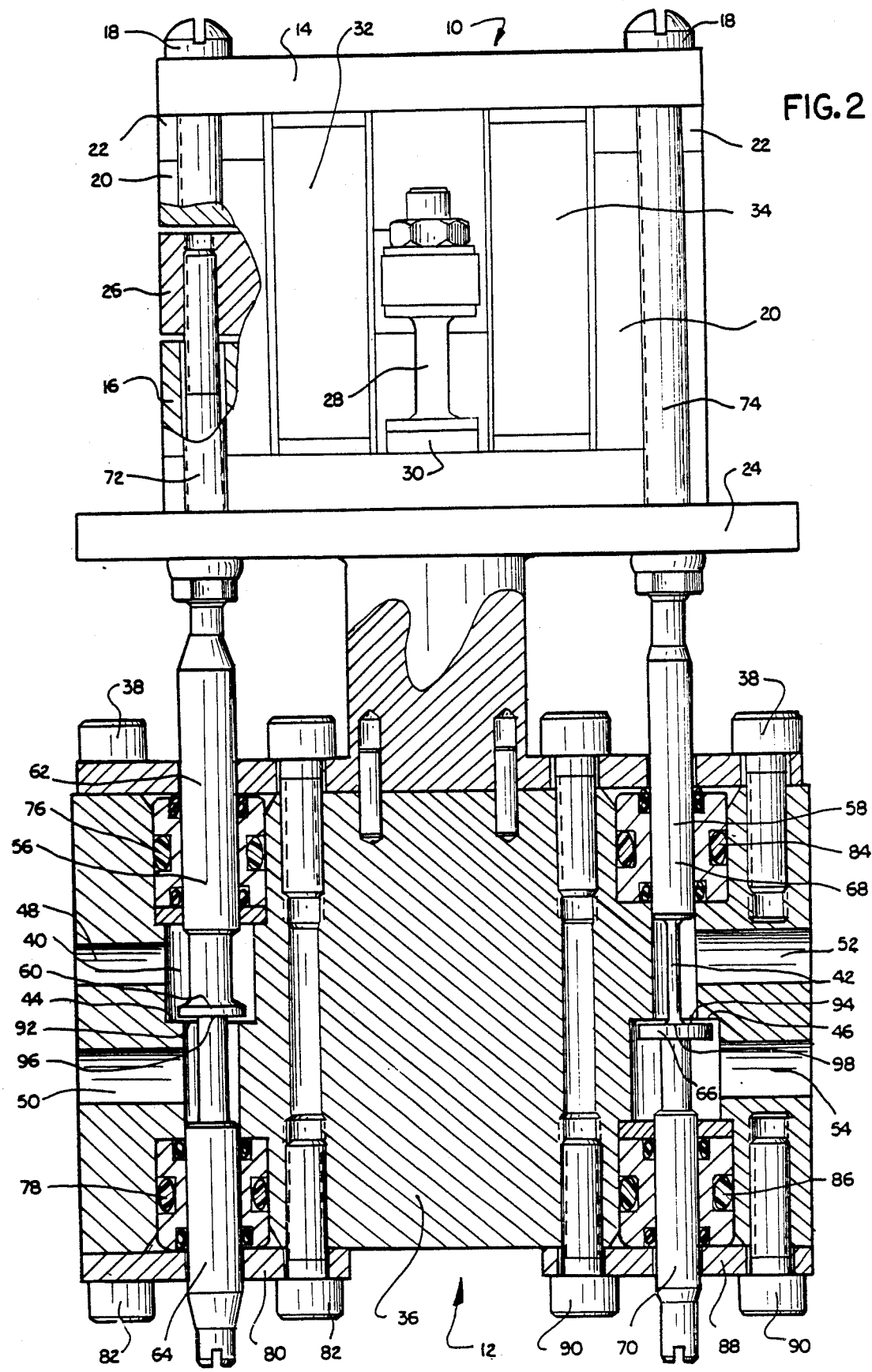

4,934,406

THROTTLING VALVE

BACKGROUND OF THE INVENTION

1. Field of the Invention

The present invention is generally directed to flow control valves and, more particularly, bi-propellant valves that control separate flows in substantially constant proportion over a range of flow rates.

2. Description of the Prior Art

Over the years, various types of flow control valves have been developed for rocket engine applications. Examples are shown in the brochure "Fox Venturi Valves" published by Fox Valve Development Company of East Hanover, N.J.

In valve applications such as bi-propellant valves for use in liquid rocket engines, it is very important that the flows occur in a substantially constant proportion. In the prior art, hydraulically or pneumatically actuated, pressure balanced throttling valves are often used for this purpose. "Fox Venturi Valves" shows one such valve wherein the propellant and oxidizer are introduced to the combustion chamber through two cavitating venturi ports. Two precision machined, needle-like pintles are located in respective throats of the cavitating venturi ports to provide respective annular orifices. The pintles are needle-shaped such that the size of the orifice is determined by the position of the pintles. The pintles are controlled by a servo valve that is driven in response to a command signal. By controlling the position of the pintles, the servo valve determines the sizes of the orifice in the venturi throat and, thus, the flow rate. The venturi throats are designed such that critical flow is maintained over a range of flow rates. Thus, the venturi ports continuously provide throttled liquids over the range of flow rates.

Typically, in rocket applications, the servo valve is powered by internal line pressure from liquid fuel on-board the rocket. This avoids the need for hydraulics or large on-board power supply systems. However, this system also has several disadvantages. It is inefficient in that fuel that is vented to adjust the position of the valve, together with quiescent leakage of the servo valve, is merely dumped overboard. Also, manufacture of the pintles required high precision machining and matching as well as high surface finishes. The necessary contours, surface areas and finishes of the pintles are difficult to attain and to reliably reproduce.

Accordingly, there was a need in the prior art for a bi-propellant flow control valve that was more fuel efficient and that was simpler and less difficult to manufacture.

SUMMARY OF THE INVENTION

In accordance with the subject invention, a mechanically balanced dual valve is actuated by a torque motor having an electromagnetic stator and an armature that pivots in response to energization of the stator. The assembly further includes a valve body that has first and second internal seats that respectively communicate with first and second inlet ports and first and second outlet ports. First and second valve members that extend inside the valve body are connected to the armature of the torque motor such that they move in an opposite sense in response to the pivotal movement of the armature. The valve members cooperate with the respective valve seats to control fluid flow between the inlets and outlets of the valve body.

Preferably, a flexure element provides cantilevered support for the armature and the valve members are connected to opposite ends of the armature. Also preferably, the valve members are provided with a molded elastomer to form a seal between the valve members and their respective valve seats.

Also preferably, the stator includes a permanent magnet that produces a torque on the armature, but the flexure element has a spring rate such that it produces a higher torque on the armature.

Other details, objects and advantages of the invention will become apparent as the following description of a presently preferred embodiment proceeds.

BRIEF DESCRIPTION OF THE DRAWINGS

The accompanying drawings show a presently preferred embodiment of the invention in which:

FIG. 2 is an elevation view of the bi-propellant valve of FIG. 1 with portions thereof broken away to better disclose the internal structure of the valve.

DESCRIPTION OF THE PREFERRED EMBODIMENT

Figure 1:
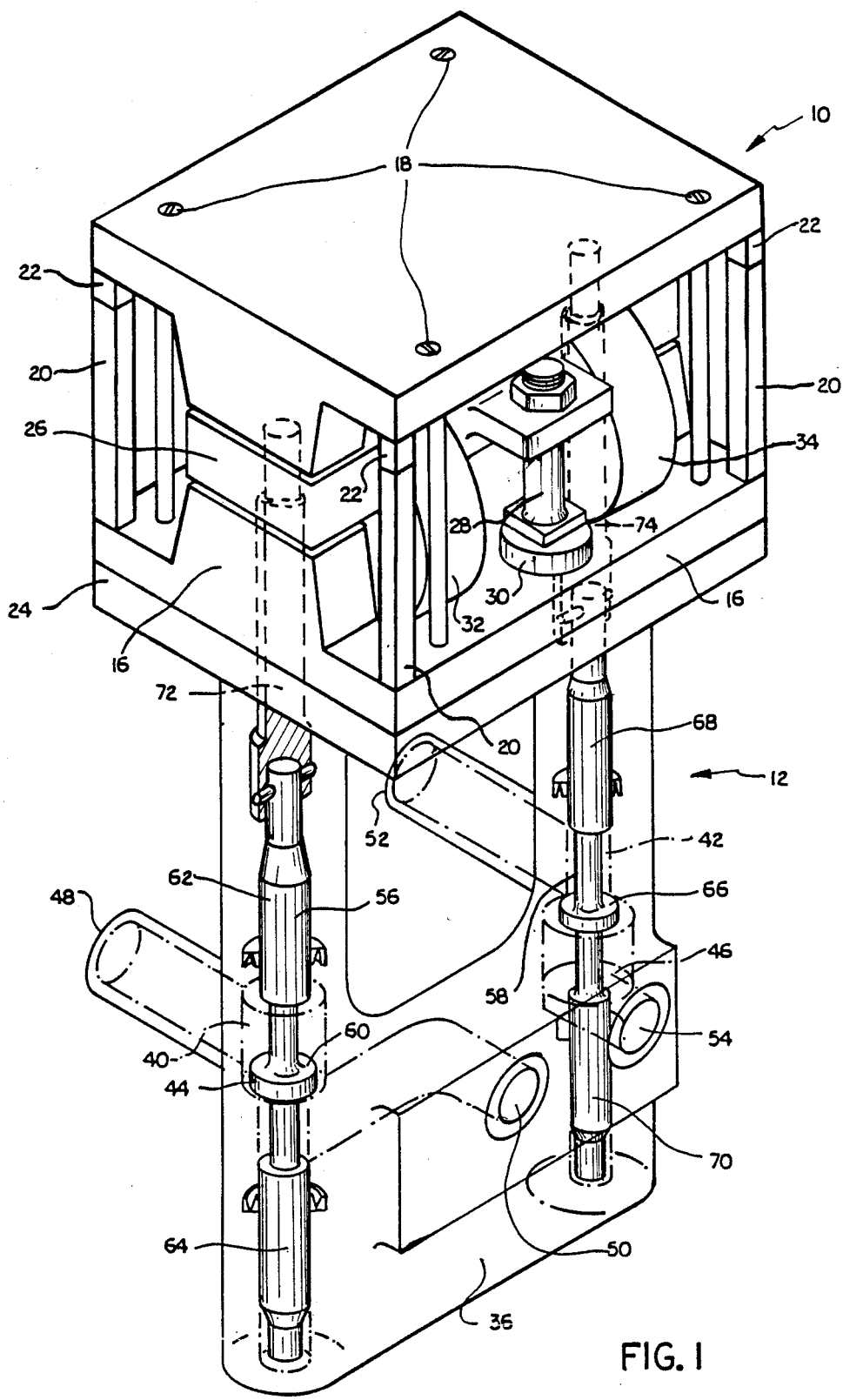
FIG. 1 is an exploded orthographic view of a bi-propellant valve in accordance with the subject invention.

As shown in FIGS. 1 and 2, the bi-propellant valve disclosed herein includes an actuator 10 and a valve 12. Actuator 10 is a torque motor that includes first and second pole pieces 14 and 16 that are fastened together by screws 18. Four permanent magnets 20 with respective spacers 22 are arranged end-to-end and secured between respective corners of pole pieces 14 and 16 by screws 18. Pole piece 16 is secured to a manifold 24.

An armature 26 is located between pole pieces 14 and 16 as well as between oppositely disposed and permanent magnets 20. Armature 26 is supported in cantilevered fashion by a flexure element 28 and spacer 30 which are secured to pole piece 16. Under static conditions, the spring rate of flexure element 28 is sufficient to maintain armature 26 in a substantially central position at times when the torque motor is not electrically energized. Two electrical coils 32 and 34 are maintained between pole pieces 14 and 16 such that armature 26 extends through the central hole of both coils. Coils 32 and 34 are wound in the same direction and electrically connected in series.

Valve 12 includes a valve body 36 that is secured to manifold 24 by cap screws 38. Valve body 36 includes valve cavities 40 and 42 having internal seats 44 and 46 respectively. Valve cavity 40 is in communication with inlet 48 and outlet 50. Valve cavity 42 is in communication with inlet 52 and outlet 54.

Valve members 56 and 58 extend into valve cavities 40 and 42 respectively. Valve member 56 includes poppet 60, valve stem 62 and extension 64. Similarly, valve member 58 includes poppet 66, valve stem 68 and extension 70. Valve stems 62 and 68 are threadingly connected to opposite ends of armature 26 by threaded rods 72 and 74.

A seal 76 is provided around valve stem 62 and a seal 78 is provided around extension 64 to prevent fluid leakage between body 36 and valve member 56. Seal 76 is maintained in valve body 36 by manifold 24 and seal 78 is maintained by a cover 80 secured by cap screws 82. Similarly, with valve member 58, a seal 84 is provided around valve stem 68 and a seal 86 is provided around extension 70 to prevent leakage of fluid between valve member 58 and body 36. Seal 84 is maintained in valve body 36 by manifold 24 and seal 86 is maintained by cover 88 secured by cap screws 90.

In the operation of the preferred embodiment, under static conditions with coils 32, 34 not energized, permanent magnets 20 and flexure element 28 maintain armature 26 in equilibrium position. In equilibrium position the ends of armature 26 are balanced substantially midway between pole pieces 14 and 16. The air gap between armature 26 and pole piece 14 is substantially equal to the air gap between armature 26 and pole piece 16. Permanent magnets 20 are included between pole pieces 14 and 16 of the actuator to better linearize the armature response to current in coils 32 and 34; to limit power requirements for the actuator; and to lower the response time for the actuator by increasing baseline magnetic flux density. The torque in armature 26 developed by permanent magnets 20 alone is insufficient to overcome the counter-torque provided by flexure element 28. Thus, armature 26 remains in its equilibrium position as long as coils 32 and 34 are de-energized.

However, when coils 32 and 34 are energized, the torque developed in armature 26 overcomes the counter-torque of flexure element 28. At one end of armature 26, the air gap between armature 26 and pole piece 14 closes and the air gap between armature 26 and pole piece 16 opens. At the same time, at the other end of the armature, the air gap between pole piece 14 and armature 26 opens and the air gap between armature 26 and pole piece 16 closes. The sense of movement of armature 26 depends on the direction of current in coils 32 and 34 and direction of the coil windings.

The ends of armature 26 are connected to valve members 56 and 58 by adjustment threads such that, when armature 26 is in the equilibrium position, poppet 60 is lightly biased against internal seat 44 to form a seal between inlet 48 and outlet 50 and poppet 66 is lightly biased against internal seat 46 to form a seal between inlet 52 and outlet 54. Thus, no oxidizer flow occurs between inlet 48 and outlet 50, and no propellant flow occurs between inlet 52 and outlet 54.

When coils 32 and 34 are energized and armature 26 moves in response thereto, poppets 60 and 66 are moved away from the internal seats 44 and 46 respectively to establish flow conditions between inlet 48 and outlet 50 through valve cavity 40, and between inlet 52 and outlet 54 through valve cavity 42. Thus, oxidizer is provided at outlet 50 and propellant is provided at outlet 54.

The degree of displacement of armature 26 between the open and closed positions determines the size of the valve orifice between internal seats 44 and 46 and poppets 60 and 66 respectively. The degree of displacement of armature 26 is substantially directly proportional to the current in coils 32 and 34. In this manner, the flow of oxidizer and propellant through the valve is substantially proportional to the current applied to coils 32 and 34. Thus, the flow rates of liquids through the valve are controlled without high-precision machining by controlling the current to coils 32 and 34.

The poppet valves are oriented in opposite sense to make them compatible with the fundamental operation of the torque motor. The fuel and oxidizer poppets are contoured to maintain a constant mixture ratio throughout the throttling range. The mixture ratio is determined by the relative porting of valve cavities 40 and 42 in the valve body. This is accomplished with well-known manufacturing processes that are less expensive and have a higher degree of repeatability than the processes required by prior art devices. The sealing surfaces 92 and 94 of poppets 60 and 66 are coated with a molded elastomer 96 and 98 to provide better shutoff and sealing conditions. The compressibility of the elastomer permits both poppets to shut off substantially simultaneously.

While a presently preferred embodiment of the subject invention is shown and described herein, it is to be understood that the invention is not limited thereto, but can otherwise by variously embodied within the scope of the following claims.

I claim:

1. A mechanically balanced valve and actuator comprising:
   an electromagnetic stator including an electrical coil having two separate coil windings and a core having a permanent magnet;
   an armature with opposite ends extending through a separate one of said coil windings, and having a pivotal movement in response to energization of aid stator and supported on a flexure element in cantilever fashion, said flexure element having a spring rate which provides a torque on said armature that is greater than the torque provided by said permanent magnet;
   a valve body having first and second internal seats that are respectively in communication with first and second inlet ports and with first and second outlet ports; and
   first and second valve members that are connected to opposite ends of said armature and are movable in opposite directions in response to the movement of said armature, said first and second valve members cooperating with said first and second seats respectively to control fluid flow between said first and second inlets and said first and second outlets.

2. The mechanically balanced valve of claim 1 wherein the electrical windings on said two coils are arranged such that the coil on one side of said flexure element adds to the torque exerted on the armature by said permanent magnet and the coil on the other side of said flexure element opposes the force developed by said permanent magnet.

* * * * *